123,705

UNITED STATES PATENT OFFICE.

THOMAS JAMES, OF NEWPORT, ENGLAND, ASSIGNOR TO J. NEWTON SEARS, OF NEW YORK.

IMPROVEMENT IN METHODS OF RESTORING FILES.

Specification forming part of Letters Patent No. 123,705, dated February 13, 1872; antedated February 3, 1872.

I, THOMAS JAMES, of Newport, in the county of Monmouth, England, have invented an "Improved Method of Restoring the Teeth of Old or Worn Files," of which the following is a specification:

This invention has for its object the reproduction or renovation of the teeth of worn-out files; and it consists in removing from the face of such files all grease and other substances, and then suspending such files, separately and independently, in a solution of acid or saline compound mixed with water, as hereinafter more fully set forth.

The files being first perfectly freed from grease and adhering foreign substances by any known means, are placed in the acid or saline solution mixed with water, in such a manner as to be suspended freely and independently in the same. They are then placed in connection with the positive pole of a galvanic-battery or other generator of electricity, and the negative pole of the same being placed in the solution the renovating action immediately commences.

The process ordinarily requires from twenty to thirty minutes according to the state of the files, the strength of the solution, and intensity of the electric current; but as either of these may vary considerably the actual time occupied will also vary, and can only be determined by the inspection of the files. When these files have been sufficiently acted upon in the bath they are removed therefrom and are washed, gently brushed, and placed in a weak alkaline solution to remove the acid. They are then dried and oiled, and are ready for use.

I find that a good result is obtained with files that are well tempered when the quantity of acid equals ten per cent. of the quantity of water; the acid consisting of a mixture of nitric and sulphuric acids in the proportion of two parts of the former to one of the latter.

For files that are too soft and require hardening or tempering, a mixture of a saturated solution of sulphate of iron acidified with five per cent. of sulphuric acid will both renew the teeth and harden the files. In this case an intense current of electricity is required.

I am aware of the patent granted to W. B. Gillett, February, 1860, wherein he decomposes a solution of acid by passing a current of electricity through the solution and liberates the corrosive element, so that the same will attack and dissolve the substance of a file immersed in the solution; such I do not claim as my method. I first remove all foreign substance, and then suspend the files separately in a saline compound mixed with water, and then subject them to a current of electricity; after which they are washed in an alkaline solution.

Claim.

I claim as my invention—

The method of renewing the teeth and hardening the plates of old files by a mixture of a saturated solution of acidified sulphate of iron and sulphuric acid, said files being subjected to a strong current of electricity in the bath, in the manner described.

THOMAS JAMES.

Witnesses:
 WM. ROBT. LAKE,
 JAMES TECNE,
Clerk to Messrs. Haseltine, Lake & Co., Southampton Buildings, London.